May 21, 1929. W. S. SOMMER 1,714,327
EMERGENCY VALVE FOR SUBMARINES
Filed April 11, 1928  2 Sheets-Sheet 1
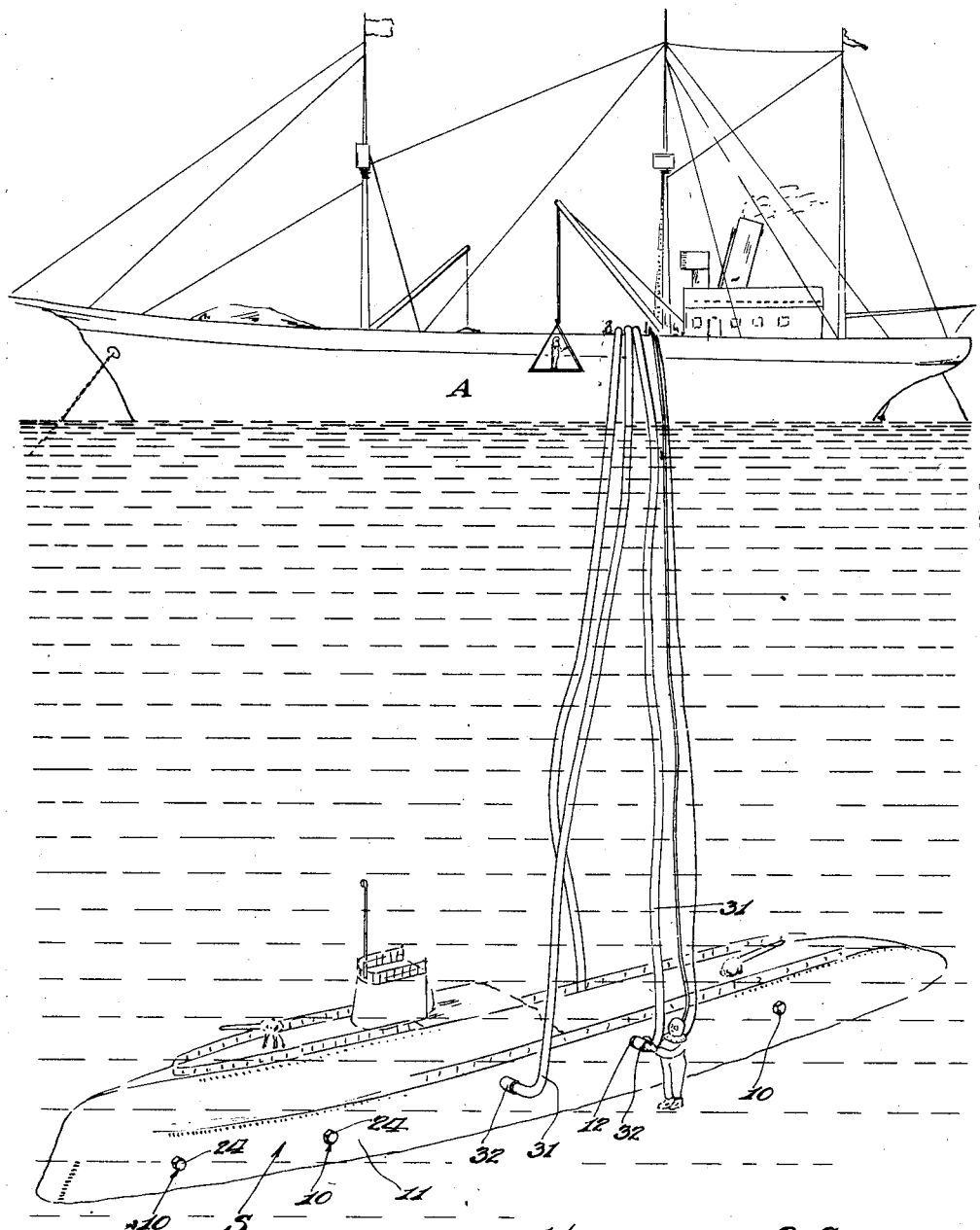
WOLDEMAR S. SOMMER
INVENTOR May 21, 1929.　　　W. S. SOMMER　　　1,714,327
EMERGENCY VALVE FOR SUBMARINES
Filed April 11, 1928　　2 Sheets-Sheet 2
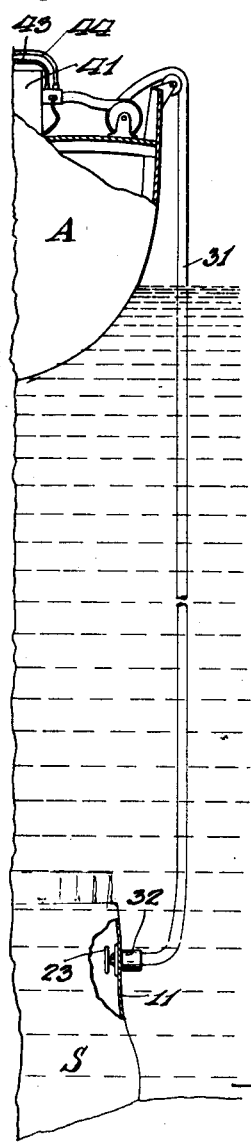
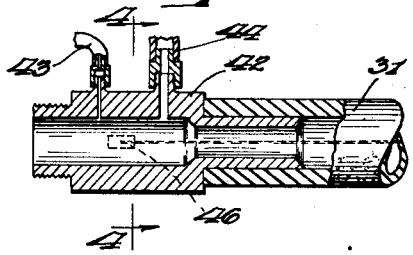
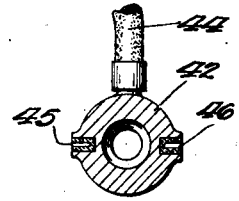
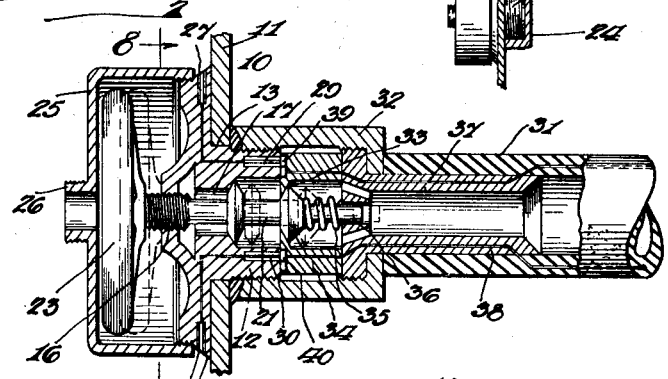
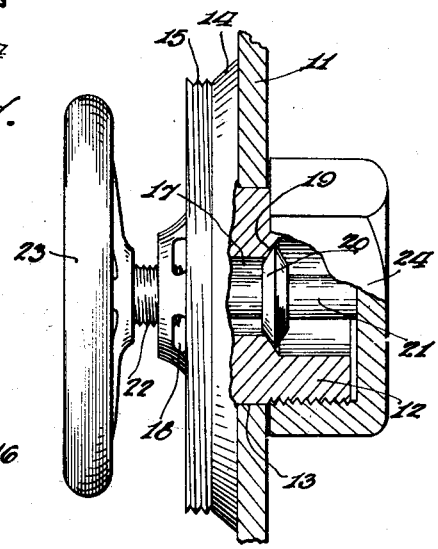
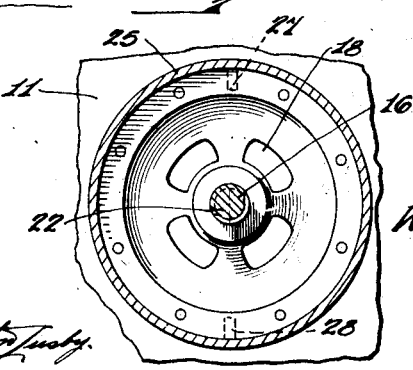
WOLDEMAR S. SOMMER
INVENTOR
BY Victor J. Evans
ATTORNEY Patented May 21, 1929.

1,714,327

UNITED STATES PATENT OFFICE.

WOLDEMAR S. SOMMER, OF WEST BRIGHTON, NEW YORK.

EMERGENCY VALVE FOR SUBMARINES.

Application filed April 11, 1928. Serial No. 269,278.

This invention relates to improvements in emergency valves for submarines.

The primary object of the invention resides in an emergency valve which constitutes part of the equipment of the same and by the use of which, in case of accident and sinking, communication may be established between the crew of the sunken ship and persons on the surface of the water, and which also facilitates the supplying of oxygen to the interior of the ship, the passing of food thereto, and the pumping of water therefrom.

Another object of the invention is to provide emergency valves adapted to be mounted in the side walls of a submarine and which are so arranged that each compartment of the submarine contains one, so that any life trapped therein may be prolonged until such time as the ship is raised or the occupants removed.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a view of a sunken submarine equipped with my emergency valve and showing the manner of establishing communication between the same and a salvage ship.

Figure 2 is an end view of the same with parts broken away in section.

Figure 3 is a detail vertical longitudinal sectional view of the upper end of the connecting hose.

Figure 4 is a vertical transverse sectional view on the line 4—4 of Figure 3.

Figure 5 is a view of the emergency valve in elevation with the outer sealing cap in section.

Figure 6 is an enlarged vertical sectional view through the emergency valve with the lower end of the hose connected therewith.

Figure 7 is an enlarged elevational view of the valve with parts broken away in section showing the inner cap removed.

Figure 8 is a vertical transverse sectional view on the line 8—8 of Figure 6.

Referring to the drawings by reference characters, the letter S designates a sunken submarine equipped with my improved emergency valves 10, which are mounted in the side plates 11 thereof at suitable spaced distances so that each compartment of the submarine contains at least one. Each emergency valve 10 includes an externally threaded nipple 12 which extends through an opening 13 in the plate 11 and projects beyond the outer side of the plate to facilitate certain connections to be hereinafter explained. The nipple 12 has an annular flange 14 provided on the inner end thereof which engages the inner sides of the plate and is secured thereto by rivets or the like. The periphery of the flange is screw threaded as at 15 while the center is provided with a threaded opening 16 in axial alignment with the bore 17 in the nipple. Slots or openings 18 are also provided in the flange for establishing communication with the bore 17 and the interior of the submarine. The wall of the bore 17 is formed with a valve seat 19 with which a valve disk 20 co-acts, and which valve disk is fixedly carried by a valve stem 21 having a threaded portion 22 for threading engagement with the threaded bore 16. A hand wheel 23 is fixed to the inner end of the valve stem by which rotation may be imparted to the same to seat and unseat the valve disk 20. When the valve disk is seated, the outer end of the valve stem terminates on a plane even with the outer end of the nipple 12 for normally abutting an outer screw cap 24 threaded to the outer end of the nipple. Under ordinary conditions, the valve is closed and cannot be opened by any member of the crew of the sunken ship as the cap 24 acts as a stop for preventing the turning movement of the valve stem. An inner screw cap 25 is threaded to the threads 15 of the flange 14 to house the hand wheel 23 and is provided with a threaded nipple 26 for the connection of one end of a hose when the valve is being used to pump water from the interior of the sunken ship.

The flange 14 is provided with an electric socket 27 and a telephone socket 28 which are electrically connected to corresponding sockets 29 and 30 respectively in the outer end of the nipple 12.

Employed in connection with the emergency valve 10 for salvage and life saving purposes is a hose 31 having a hose coupling 32 at the lower end thereof and which is threadedly connected to the nipple 12 after a diver has descended and removed the outer cap 24. The inside of the coupling is provided with a valve seat 33 with which a valve disk 34 is normally held seated by an expansion spring 35 which encircles the slidably mounted valve stem 36. When the coupling is connected to the nipple the valve 34 is in axial alignment with the valve stem 21 and in the path of outward movement thereof, whereby the turning of the wheel 23 by a member of the crew will cause the simultaneous unseating of the valve disk 20 and 34 whereby communication is established between the hose and the interior of the submarine. Electric wires 37 and telephone wires 38 run through the walls of the hose for the length thereof and connect with wiping contacts 39 and 40 respectively for effecting an operative connection with the sockets 29 and 30 respectively. The crew of the submarine may plug into the sockets 27 and 28 to receive electric current sent down from the surface of the water and effect a telephone connection with the surface.

The upper end of the hose leads to a water pump 41 mounted on the deck of a salvage ship A and is connected thereto through a coupling 42. The pump 41 is employed for pumping water from the inside of the submarine through the emergency valve after the valve has been properly opened. An oxygen line 43 is tapped into the coupling 42 to supply fresh air to the interior of the sunken ship through the hose and emergency valve when the hose is not being used for other purposes. A food supply line 44 is also tapped into the coupling 42 for passing liquid food down through the hose to the men trapped in the submarine to subsist them until they are removed. The coupling 42 has sockets 45 and 46 therein for electric plugs and telephone plugs and which connect with the top ends of the wires 37 and 38 respectively.

From the foregoing description, it will be seen that a submarine equipped with my emergency valve may be salvaged by effecting a pumping connection between the interior of the ship and a salvage ship, and the same valve and hose receives air and food at separate times to maintain the life of the trapped persons. Also, telephone connection may be effected between the crew and the surface by which communication is established, and electric current may be passed down to the interior of the submarine for lighting and other purposes.

It might be well to mention, that the inner cap 25 is removed by the crew to gain access to the wheel 23 for opening the valves at the proper time but is replaced when the valve is to be used during the water pumping operation, as it serves a means of effecting a hose connection by which the water below the level of the openings 18 may be removed. The air and food passes from the surface through the hose 31 and out of the openings 18.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. An emergency valve for submarines comprising a nipple adapted to be mounted in the hull of a submarine having a valve seat therein, a valve stem threaded in said nipple, a valve member on said valve stem for co-action with said seat, and a cap removably mounted on the outer end of said nipple in the path of movement of said valve stem for engagement thereby for preventing the movement thereof to unseat said valve member.

2. An emergency valve for submarines comprising a nipple adapted to be mounted in the hull of a submarine having a valve seat therein, a valve stem threaded in said nipple, a hand wheel fixed to the inner end of said valve stem, a valve member on said valve stem for co-action with said seat, and a cap removably mounted on the outer end of said nipple in the path of movement of said valve stem for engagement thereby for preventing the movement thereof to unseat said valve member, and an inner cap threaded to said nipple and enclosing said hand wheel.

3. An emergency apparatus for submarines including a hand operated valve having a threaded nipple, a hose connected to said nipple, a valve within said hose in the path of open movement of said hand operated valve, and spring means acting upon said valve to urge the same to a closed position, whereby opening of said hand operated valve will simultaneously move said other valve to an open position against the action of said spring means.

4. In a submarine having a threaded nipple extending exteriorly therefrom, a valve seat provided in said nipple, a valve stem threaded in said nipple, a handle wheel on the inner end of said valve stem, a valve member carried by said valve stem, a hose having a coupling threadedly connected to said nipple, a valve seat in said coupling, a valve member slidably mounted in said coupling in axial alignment with said first valve member and being disposed in the path of movement of said valve stem, and spring means acting upon said second valve member to urge the same toward its seat, whereby opening of said first valve member by manual turning of said hand wheel will cause said valve members to open simultaneously.

5. In a submarine having a threaded nipple extending therefrom, electric sockets provided in the inner and outer ends of said nipple and being electrically connected together, a hose provided with a coupling for threaded engagement with said threaded nipple, electric contacts carried by said coupling for engagement with the outer electric sockets, and electric wires passing through said hose and connected with said electric contacts.

6. In a submarine having a nipple mounted in a wall thereof and extending interiorly and exteriorly thereof, a valve seat provided in said nipple, a valve stem threaded in said nipple, valve members carried by said valve stem, manipulative means on the inner end of said valve stem to enable the manipulation of the same within a submarine, and a closure cap removably connected to the exteriorly extending end of said nipple for closing the same and for engagement by said valve stem when said valve member is in a closed position upon said valve seat for preventing unseating of said valve member by the manipulation of said manipulative means within the submarine until said closure cap is removed.

In testimony whereof I have affixed my signature.

WOLDEMAR S. SOMMER.